United States Patent [19]
Reed, Jr.

[11] 3,816,380
[45] June 11, 1974

[54] TELECHELIC COPOLYMERS OF DIENES AND POLYMERIZABLE FERROCENE OR CARBORANE COMPOUNDS

[76] Inventor: Samuel F. Reed, Jr., 49 Brookside Dr., Holland, Pa. 18966

[22] Filed: June 18, 1971

[21] Appl. No.: 155,669

[52] U.S. Cl.............. 260/82.1, 260/83.5, 260/86.3, 260/439 CY, 260/606.5 B, 149/19.2
[51] Int. Cl. ............................................ C08f 19/00
[58] Field of Search ....... 260/439 CY, 83.5, 85.3 R, 260/85.3 C, 82.1, 86.3, 606.5 B; 149/19.2

[56] References Cited
UNITED STATES PATENTS

| | | | |
|---|---|---|---|
| 3,146,260 | 8/1964 | Ager et al. | 149/22 UX |
| 3,183,216 | 5/1965 | Cohen et al. | 149/22 UX |
| 3,301,836 | 1/1967 | Green et al. | 149/22 X |
| 3,518,241 | 6/1970 | Duling et al. | 260/89.5 |
| 3,586,552 | 6/1971 | Potts et al. | 149/20 X |
| 3,718,633 | 2/1973 | Baldwin et al. | 149/19 |

FOREIGN PATENTS OR APPLICATIONS

| | | | |
|---|---|---|---|
| 601,243 | 7/1960 | Canada | 260/439 CY |

OTHER PUBLICATIONS

Bamford et al., Trans. Faraday Soc. 56, 932-42 (1960) TK 1 F 25

Horspool et al., Can. J. Chem., 47, 3805-8 (1969) QD 1 C 2

Van Landuyt et al., J. Polymer Science, Part A-1, 9, 523-529 (1971) QD 281 P6 J 62

Primary Examiner—Benjamin R. Padgett
Assistant Examiner—E. A. Miller
Attorney, Agent, or Firm—Edward J. Kelly; Herbert Berl; Jack W. Voigt

[57] ABSTRACT

Copolymers of a diene selected from butadiene, isoprene, and chloroprene and a polymerizable monomer selected from ferrocenylmethyl methacrylate, isopropenylferrocene, 1-ferrocenylbutadiene, 2-ferrocenyl-butadiene, vinylcarborane, isopropenylcarborane and carboranylmethyl acrylate are disclosed along with preparative procedures therefor. Copolymerizations are carried out in solution (toluene or dioxane) with a suitable polymerization initiator selected from an azo compound to introduce either carboxyl or hydroxyl functionality into the copolymers.

7 Claims, No Drawings

TELECHELIC COPOLYMERS OF DIENES AND POLYMERIZABLE FERROCENE OR CARBORANE COMPOUNDS

BACKGROUND OF THE INVENTION

Considerable literature exists on the preparation of polydienes of the telechelic type prepared by both anionic and free radical initiators.

Well known in the propellant field is the fact that the burning rate of many solid propellants can be increased by the introduction of certain additives. Many ferrocene or carborane derivatives have been utilized as additives for this purpose, usually in the form of liquids in which state they also serve as plasticizing agents. In the liquid state the additives exhibit the inherent disadvantages characteristic of liquid additives such as loss by evaporation, migration, etc., and consequently, the propellant systems suffer, particularly on long term storage.

Thus, a need exists for a modified form of ferrocene or carborane additive which form is not subject to being lost by evaporation or migration from a stored propellant composition.

An object of this invention is to combine a selected ferrocene or carborane additive with the binder being utilized in the propellant system.

Another object is to combine the selected ferrocene or carborane additive and the binder material via a polymerization technique into a serviceable prepolymer suitable for propellant mixing and curing.

A specific object of this invention is to copolymerize a binder material and a catalyst material to provide a liquid copolymer which is capable of undergoing a cure reaction when used in a propellant composition to form a rubber-like binder material having a burning rate catalyst agent as an integral part thereof.

SUMMARY OF THE INVENTION

Copolymers of dienes selected from butadiene, isoprene, and chloroprene and polymerizable monomers selected from ferrocenylmethyl methacrylate (FMMA), isopropenylferrocene (IPF), 1-ferrocenylbutadiene (1-FB), 2-ferrocenylbutadiene (2FB), vinylcarborane (VC), isopropenylcarborane (IPC), and carboranylmethyl acrylate (CMA) are prepared through free radical copolymerization in an inert organic solvent (e.g., toluene or dioxane) using an azo compound initiator selected from azobis (2-methyl valeric acid) (AMCV), 4,4'-azobis (4cyanopentanoic acid) (ACPA), and 4,4'-azobis (4cyano-n-pentanol) (HMHV). The reaction periods may vary from about 72–96 hours while the reactor is maintained at temperature from about 66°–67°C. Comonomer weight ratios may be varied from about 1:1 to about 19:1 (diene to monomer weight ratio). Physical properties of the copolymers may best be controlled by varying the initiator concentration. The copolymers are characterized by molecular weights in the range from about 1,500 to about 10,000, and end group ($CO_2H$ or OH) from about 0.1 to about 5.0 weight percent. Boron contents of the copolymers may be varied from about 0–30 weight percent; iron contents of the copolymers may be varied from about 0–15 weight percent.

DESCRIPTION OF THE PREFERRED EMBODIMENTS

The copolymers of this invention are liquids which contain terminal groups ($CO_2H$ or OH) and are capable of undergoing a cure reaction to a final rubber-like state. The usefulness of these copolymers is directed to their application as binders in high burning rate solid propellants.

The general descriptive technique of polymer preparation is set forth below for the diene, butadiene, and the monomer, carboranylmethyl acrylate (CMA). Following this descriptive technique will be Tables I–VIII which illustrate the experimental data on preparation of other copolymers and physical property data for the particular copolymers set forth.

A general descriptive technique employed in the copolymerization of butadiene and CMA and used in all other copolymerizations is as follows: to a glass high-pressure reactor (aerosol tube) are introduced 30 ml of dioxane, 1.0 g (3.34 mmoles) CMA and 3.28 g (10.7 mmoles) azobis (2-methyl valeric acid) (AMCV). The reactor is attached to a vacuum line and deaerated by three alternate freeze-thaw cycles. At this point 19.0 g (352 mmoles) of butadiene are condensed into the reactor, and the reactor is removed from the vacuum line and placed in an oil bath at 66°–67°C. Heating is continued for a period of 72 hours. On cooling, the reactor is vented, the solvent removed by evaporation, and the copolymer reprecipitated by dissolving in ether followed by the addition of methanol. After decanting the solvents, the copolymer is stripped of excess solvents on a rotary evaporator, and finally dried at 70°–75°C. under reduced pressure (1 mm) for a period of 24 hours. The liquid copolymer is then characterized by its molecular weight, hydroxy-end group content and elemental analysis. These values are: molecular weight — 3,500, carboxyl-end group content — 2.56, boron — 2.55 percent (calculated 2.37 percent).

The experimental data for examples of other copolymerizations are given in the following Tables (I–VIII). Comonomer weight ratios are varied from approximately 1:1 to 19:1. Physical properties of the copolymers may best be controlled by varying the initiator concentration. It is reasonable to expect molecular weights in the range of 1,500–10,000 and end group ($CO_2H$ or OH) from 0.1 to 5.0. Boron contents of the copolymers may be varied from 0–30 weight percent; iron content from 0–15 weight percent.

COPOLYMERS OF BUTADIENE — CMA

TABLE I

EXPERIMENTAL DATA ON PREPARATION OF BUTADIENE-CMA COPOLYMERS
[Temperature 65°–72 hours]

| No. | Butadiene(Bd) (g/mmoles) | CMA (g/mmoles) | Wt. ratio Bd/CMA | AMCV (mmoles) | Weight polymer (g) | Yield (percent) |
|---|---|---|---|---|---|---|
| 1 | 19.0/352 | 1.0/3.24 | 19/1 | 10.70 | 13.0 | 65 |
| 2 | 17.0/315 | 3.0/9.8 | 17/3 | 9.74 | 10.7 | 53 |
| 3 | 15.0/277 | 5.0/16.2 | 15/5 | 8.79 | 11.9 | 58 |
| 4 | 10.0/185 | 10.0/32.4 | 10/10 | 6.52 | 13.2 | 66 |

TABLE II
PHYSICAL PROPERTY DATA ON BUTADIENE/CMA COPOLYMERS

| No. | Molecular Weight ($M_n$) | Weight % $CO_2H$ | % B Found | % B Calculated |
|---|---|---|---|---|
| 1 | 3500 | 2.56 | 2.55 | 2.37 |
| 2 | 3400 | 2.28 | 10.4 | 7.09 |
| 3 | 3200 | 2.02 | 12.8 | 11.82 |
| 4 | 2500 | 1.45 | 20.0 | 23.74 |

COPOLYMERS OF ISOPRENE — FMMA

TABLE III
EXPERIMENTAL DATA FOR PREPARATION OF ISOPRENE-FMMA COPOLYMERS

| No. | Isoprene g. (moles) | FMMA g. (moles) | AMHV g. (moles) | Molar ratio isoprene/FMMA | Solvent (30 ml.) | Weight copolymer (g) | Yield (percent) |
|---|---|---|---|---|---|---|---|
| 5 | 19 (352) | 1 (3.5) | 2.69 (10.7) | 100.5 | Dioxane | 12.5 | 63.5 |
| 6 | 17 (315) | 3 (10.5) | 2.46 (9.8) | 30.0 | Dioxane | 11.7 | 58.5 |
| 7 | 15 (277) | 5 (17.5) | 2.23 (8.8) | 15.8 | Dioxane | 15.0 | 75.0 |
| 8 | 10 (185) | 10 (35) | 1.66 (6.6) | 5.3 | Dioxane | 17.6 | 88.0 |

TABLE IV
PHYSICAL PROPERTY DATA ON ISOPRENE/FMMA COPOLYMERS

| No. | Molecular Weight | Weight % OH | % Fe Calculated | % Fe Found |
|---|---|---|---|---|
| 5 | 3300 | 1.20 | 1.02 | 1.1 |
| 6 | 3800 | 0.78 | 3.08 | 2.5 |
| 7 | 4400 | 0.27 | 10.29 | 6.3 |

COPOLYMERS OF BUTADIENE—ISOPROPENYLFERROCENE (IPF)

TABLE V
EXPERIMENTAL DATA FOR PREPARATION OF BUTADIENE-IPF COPOLYMERS
[Temperature 65 °C. — Time: 72 hours]

| No. | Butadiene(Bd) g. (mmoles) | IPF g. (mmoles) | AMHV g. (mmoles) | Molar ratio Bd/IPF | Solvent (30 ml.) | Weight copolymer (g) | Yield (percent) |
|---|---|---|---|---|---|---|---|
| 9 | 19 (352) | 1 (4.4) | 2.99 (10.7) | 79.64 | Dioxane | 14.4 | 72.2 |
| 10 | 17 (315) | 3 (13.2) | 2.74 (9.8) | 23.74 | Dioxane | 13.0 | 65.0 |
| 11 | 15 (277) | 5 (22) | 2.52 (8.99) | 12.52 | Dioxane | 15.4 | 75.2 |
| 12 | 10 (185) | 10 (44.1) | 1.93 (6.88) | 4.18 | Dioxane | 14.4 | 72.2 |

TABLE VI
PHYSICAL PROPERTY DATA ON BUTADIENE/IPF COPOLYMERS

| No. | Molecular Weight ($M_n$) | Weight % OH | % Fe Calculated | % Fe Found |
|---|---|---|---|---|
| 9 | 3100 | 2.94 | 1.24 | 1.4 |
| 10 | 2600 | 3.03 | 3.71 | 3.4 |
| 11 | 2600 | 2.40 | 6.21 | 5.3 |
| 12 | 6300 | 1.50 | 12.39 | 8.4 |

TABLE VII
EXPERIMENTAL DATA FOR PREPARATION OF BUTADIENE–1–FB COPOLYMER
[65 °C – 72 hours]

| No. | Butadiene(Bd) g. (mmoles) | 1-FB g. (mmoles) | AMCV g. (mmoles) | Molar ratio Bd/1-FB | Solvent (30 ml) | Weight copolymer (g) | Yield (percent) |
|---|---|---|---|---|---|---|---|
| 13 | 19 (352) | 1 (4.2) | 2.996 (10.7) | 83.8 | Dioxane | 13.7 | 68.5 |
| 14 | 17 (315) | 3 (12.6) | 2.744 (9.8) | 25.0 | Dioxane | 10.5 | 50.2 |
| 15 | 15 (277) | 5 (21) | 2.24 (9) | 13.2 | Dioxane | 7.5 | 37.5 |
| 16 | 10 (185) | 10.0 (42) | 1.904 (6.8) | 4.4 | Dioxane | 5.2 | 26.0 |

TABLE VIII
PHYSICAL PROPERTY DATA ON BUTADIENE/1-FB COPOLYMERS

| No. | Molecular Weight ($M_n$) | Weight % $CO_2H$ | % Fe Calculated | % Fe Found |
|---|---|---|---|---|
| 13 | 2800 | 3.20 | 1.18 | 2.0 |
| 14 | 2800 | 3.21 | 3.53 | 5.3 |
| 15 | 2900 | 4.33 | 5.89 | 9.5 |
| 16 | 1900 | 3.34 | 11.77 | 15.0 |

The effectiveness of copolymers of this invention as a binder-burning rate catalyst is illustrated by combining the copolymer with a plasticizer, a metal additive, and an inorganic oxidizer. A test propellant composition comprised of a selected copolymer having about a 1 weight percent iron (Fe) or a selected copolymer having about a 1 weight percent boron (B) will provide an increase of at least 20 percent in the burning rate as compared with a standard propellant composition having a diene binder which does not contain iron or boron. The test propellant composition described above contained about 10 weight percent copolymer, 10 weight percent plasticizer (isodecyl pelargonate), 10 weight percent metal additive (aluminum powder), and up to about 70 weight percent inorganic oxidizer (ammonium perchlorate).

The copolymers of this invention may be used in varying amounts from about 5 to about 30 weight percent of the propellant composition. Since the weight percent of the metallic containing monomer can also be varied over a wide range in preparing the copolymer, propellant compositions having a wide range of burning rates can be prepared using the copolymers of this invention. Also, on the basis of requirements, copolymers may be prepared which contain the iron catalyst component or the boron catalyst component. The burning rates of propellant compositions vary with an increase in the metal content of the catalyst-binder copolymers contained in the propellant compositions. Catalysts compounds containing iron, boron, or combinations thereof have been proven to be effective catalysts; however, the use of these metal compounds in a curable rubber-like polymer makes them even more attractive due to stability from migration, improvement to physical properties, etc. Other plasticizers, metal additives, or oxidizing salts may be used with the copolymers of this invention since these copolymers are compatible and curable with a wide variety of propellant ingredients.

I claim:

1. Copolymers of a diene selected from butadiene, isoprene, and chloroprene and a polymerizable monomer selected from ferrocenylmethyl methacrylate, 1-ferrocenylbutadiene, vinylcarborane, and isopropenylcarborane prepared by reacting said polymerizable monomer and a suitable polymerization initiator in an inert organic solvent with said diene at a reaction temperature and for a reaction period sufficient for said reaction to take place after which solvent removal is effected and said copolymers are dried at a suitable drying temperature while under reduced pressure; said initiator being selected from the azo initiators consisting of azobis(2-methyl valeric acid), 4,4'-azobis(4-cyanopentanoic acid), and 4,4'-azobis(4-cyano-n-pentanol); said inert organic solvent being selected from dioxane and toluene; said reaction temperature being from about 66°–67°C.; said reaction time being from about 72–96 hours; said drying is accomplished at a suitable temperature in the range of about 70°C. to about 75°C. and said reduced pressure is in the range of about 1 millimeter; said copolymers being characterized by molecular weights in the range from about 1,500 to about 10,000.

2. The copolymers prepared by the reaction of claim 1 wherein said polmerizable monomer is selected from ferrocenylmethyl methacrylate, and 1-ferrocenylbutadiene and wherein weight ratios of said diene to said polymerizable monomer is varied from about 1:1 to about 19:1 and wherein said copolymers are further characterized by having an iron content up to about 15 weight percent.

3. The copolymers of claim 2 wherein said diene selected is isoprene; said polymerizable monomer selected is ferrocenylmethyl methacrylate; said initiator selected is 4,4'-azobis(4-cyano-n-pentanol); and wherein said copolymers are still further characterized by having a molecular weight from about 3,300 to about 4,400, a weight percent of OH terminal groups from about 0.25 to about 1.20, and a weight percent Fe from about 1.1 to about 6.3.

4. The copolymers of claim 2 wherein said diene selected is butadiene; said polymerizable monomer selected is 1-ferrocenylbutadiene; said initiator selected is azobis(2-methyl valeric acid); and wherein said copolymers are still further characterized by having a molecular weight from about 1,900 to about 2,800, a weight percent of $CO_2H$ terminal groups from about 3.20 to about 4.33, and weight percent Fe from about 2.0 to about 15.

5. The copolymers prepared by the reaction of claim 1 wherein said polymerizable monomer is selected from vinylcarborane and isopropenylcarborane and wherein weight ratios of said diene to said polymerizable monomer is varied from about 1:1 to about 19:1 and wherein said copolymers are further characterized by having a boron content up to about 30 weight percent.

6. Copolymers of a diene selected from butadiene, isoprene, and chloroprene and carboranylmethyl acrylate; said copolymers being the carboxyl terminated copolymers that are prepared by reacting said carboranylmethyl acrylate and a suitable polymerization initiator in an inert organic solvent with said diene at a reaction temperature and for a reaction time period sufficient for said reaction to take place after which solvent removal is effected and said copolymers are dried at a suitable drying temperature while under reduced pressure; said initiator being selected from the azo initiators consisting of azobis(2-methyl valeric acid), and 4,4'-cyanopentanoic acid) to introduce carboxyl functionality into said copolymers; said inert organic solvent being selected from dioxane and toluene; said reaction temperature being from about 66°–67°C.; said reaction time being from about 72–96 hours; said drying is accomplished at a suitable temperature in the range of about 70°C. to about 75°C. and said reduced pressure is in the range of about 1 millimeter; said diene and said carboranylmethyl acrylate being reacted in weight ratios from about 1:1 to about 19:1; said copolymers being characterized by molecular weights in the range from about 1,500 to about 10,000, a $CO_2H$ end group from about 0.1 to about 5 weight percent, and by a boron content up to about 30 weight percent of said copolymers.

7. The copolymers prepared by the reaction of claim 6 wherein said diene selected is butadiene; said initiator selected is azobis (2-methyl valeric acid); and wherein said copolymers are still further characterized by having a molecular weight from about 2,500 to about 3,500, a weight percent of $CO_2H$ terminal groups from about 1.45 to about 2.56, and a weight percent boron from about 2.55 to about 20.

* * * * *

UNITED STATES PATENT OFFICE
CERTIFICATE OF CORRECTION

Patent No. 3,816,380      Dated June 11, 1974

Inventor(s) Samuel F. Reed, Jr.

It is certified that error appears in the above-identified patent and that said Letters Patent are hereby corrected as shown below:

The assignee should read -- The United States of America as represented by the Secretary of the Army --.

Signed and sealed this 12th day of November 1974.

(SEAL)
Attest:

McCOY M. GIBSON JR.       C. MARSHALL DANN
Attesting Officer      Commissioner of Patents